United States Patent

Mickleson

[11] 3,713,580
[45] Jan. 30, 1973

[54] ANIMAL CONTROL MEANS
[76] Inventor: James Peter Mickleson, Rural Delivery, Owhanga, New Zealand
[22] Filed: July 14, 1970
[21] Appl. No.: 54,695

[52] U.S. Cl. ..............................................231/2 E
[51] Int. Cl. ............................................B68b 11/00
[58] Field of Search ......................................231/2 E

[56] References Cited

UNITED STATES PATENTS

| 1,483,005 | 2/1924 | McNair | 307/132 R X |
| 2,204,041 | 6/1940 | Jefferson | 231/2 E |

Primary Examiner—Hugh R. Chamblee
Attorney—Dawson, Tilton, Fallon & Lungmus

[57] ABSTRACT

An animal control means consisting of a unit incorporating a mechanism capable of actuating an electric fence and a mechanism for use as an animal prodder. The control means is incorporated into a substantially cylindrical, small and portable container with the electric fence actuating mechanism at one end and the animal prodder mechanism at the other end. Both ends have switching mechanisms which are in circuit with a battery and a pulse generating unit. The electric fence mechanism has a normally outwardly urged shaft to which fence wire may be attached and the animal prodder at least one inwardly urged pin member, both being urged to their positions of rest by springs. Furthermore, they are located within insulated casings and are associated therein with switch mechanisms, such that pressure being applied to the shaft or pin, against the urging of the spring, will cause the shaft or pin to slide within the casing and to actuate the switch mechanisms and to thereby become electrified, thereby electrifying fence wire attached to the electric fence end of the unit or an animal touched with the pin of the animal prodder end of the unit. The unit is also capable of being operated by a manual switch.

4 Claims, 3 Drawing Figures

PATENTED JAN 30 1973
3,713,580
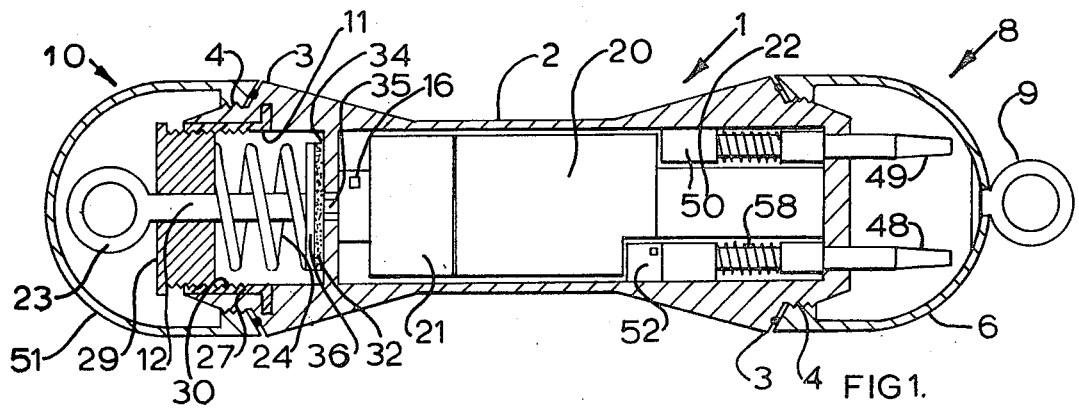
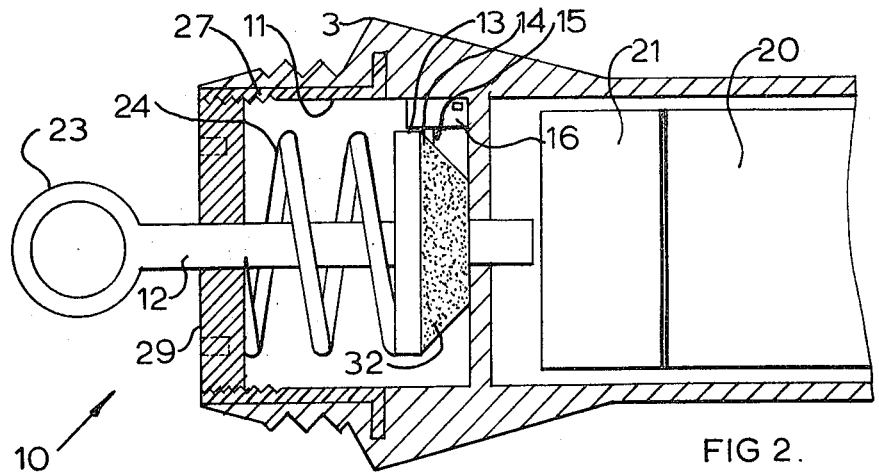
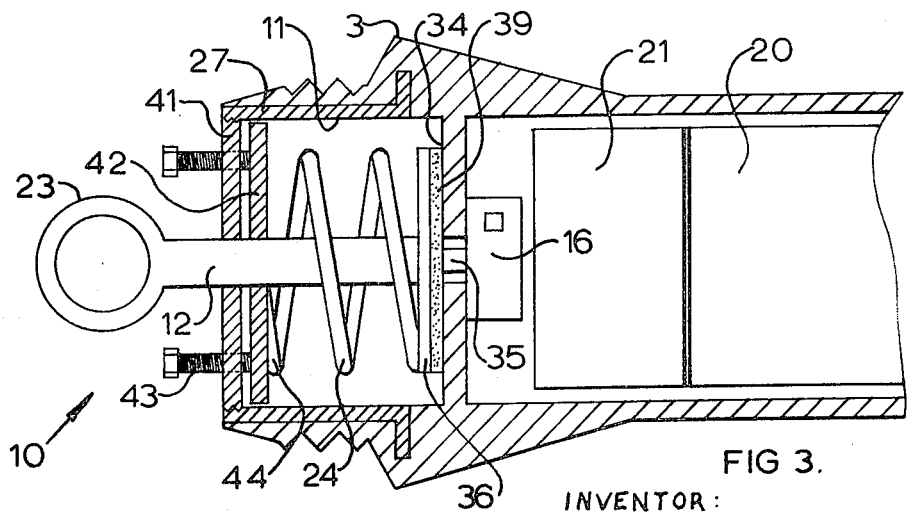
INVENTOR:
JAMES PETER MICKLESON
BY
Dawson, Tilton, Fallon and Lungmus
ATTYS.

ANIMAL CONTROL MEANS

This invention relates to a means for controlling animals and it is envisaged that the invention will be able to be used to control such animals as sheep, dairy cows, dogs and other like animals.

The manner in which the device of the present invention is used to electrify a fence is similar to that disclosed in the McNair, U.S. Pat. No. 1,483,005. That is, two parallel wires may be used with the device anchored at one end to one wire and connected at its other end to the other wire so that when an animal moves one wire, the device places an electric potential on one wire and the other wire may serve as a return current path. Alternatively, a single wire may be used with one end of the device anchored to that wire and the other end anchored to a ground post. In this case, ground acts as a return current path, rather than a second wire.

It has long been a problem on farms and in rural areas, where the constant control of animals is necessary, that there has not been in existence a small, efficient or portable unit which serves the purpose of being able to control animals by direct contact and which also serves the purpose of being able to be easily incorporated into a fence unit, thereby electrifying the fence to control animals and to more particularly seal animals off in enclosed areas.

It is therefore an object of this invention to provide a means for the controlling of animals which means is able to be incorporated into a small and portable unit which is effective yet unobtrusive. For example, a farmer may wish to take the unit when riding around his sheep or cattle and the unit of this invention would therefore be able to be taken with him easily, without being cumbersome and a hinderance to his work.

It is a further object of this invention to provide a means for the controlling of animals which is capable of operating automatically or alternatively being operated manually.

It is yet a further object of this invention to provide a means for the controlling of animals which means is contained within a sealed unit and which does not need constant adjustment and/or maintenance.

It is yet a further object of this invention to provide a means for the control of animals which means is efficient and straight forward.

According to one aspect of this invention there is provided an animal control means comprising a container, at one end of which there is provided a means adapted for attachment, to a fence wire so as to enable actuation of an electric fence mechanism and at the other end of which there is provided at least one outwardly depending pin, the electric fence attachment being normally urged inwardly and the said pin being normally urged outwardly, the container also incorporating a battery, a switching mechanism and a pulse generating unit, the arrangement being such that pressure being applied to the electric fence attachment or the pin by an animal or the like causes an electrical circuit to be completed and the attachment or pin to become electrified.

According to a further aspect of this invention there is provided a means for the actuation of switches such as those used in electric fence units, said means comprising a shaft slidably operable within a casing, an electrical switch being associated with the casing and actuable by the shaft, spring means adapted to urge the shaft to a position such that the switching means is open, the distal end of the shaft extending from the casing and being so adapted as to enable wire, such as fencing wire, to be attached thereto, the arrangement being such that upon a force being applied to move the shaft against the urging of the spring means, the shaft is caused to move within the casing to actuate or to cause to be actuated the switch.

According to yet a further aspect of this invention there is provided a means for the controlling of animals or the like, said means comprising a unit, at one end of which there is provided at least one outwardly depending pin, the distal end of the pin being slidably operable with a casing located within the unit, an electrical switching means being associated with the casing and being actuable by the distal end of the pin, spring means adapted to urge the pin outwardly to such a position that the switch is open, the arrangement being such that upon the butt end of the pin being applied to an animal or the like, the pressure will cause the pin to move inwardly within the casing, thus actuating or causing to be actuated the switch, the actuation of said switch causing an electrical charge to be carried to at least one pin, thereby giving the animal or the like an electrical shock.

This invention will now be described by way of example only, with reference to the accompanying drawings, however it will be appreciated that improvements and modifications to this invention are envisaged and that such improvements and modifications may be incorporated into the invention without departing from the scope or spirit thereof.

In the drawings:

FIG. 1 is a cross-sectional elevation of the complete unit;

FIG. 2 is a sectional elevation of the end of the unit adapted to actuate an electric fence mechanism;

FIG. 3 is an alternative form of the end of the unit shown in FIG. 2.

One end of the unit is adapted so as the unit may be used as a cattle prodder, while the other end of the unit enables the unit to be used as an electric fence unit, each end being provided with a removable cap member to cover the particular end of the unit not in use.

The unit 1 is preferably contained within a substantially cylindrical container (generally indicated at 1) constructed of a suitable plastics material. However, although the container is, in this form of the invention, constructed of plastics material, the invention is in no way limited to being constructed of such material.

The container is formed so as to be recessed substantially medially thereof, (as at 2 in FIG. 1 of the accompanying drawings) forming shoulder-like portions 3 adjacent each end of the unit. Further, each end of the unit is stepped in formation and is provided with a screw thread 4 about its outer periphery, so as to accommodate caps which are adapted to cover each end of the unit, and in particular to cover the end of the unit not in use. While the caps, in this form of the invention, are screw threaded so as to be capable of engaging with the screw thread of each end of the unit, the invention is not limited to screw threaded caps and simple clip-on caps or any other suitable form of cap may be used to cover the end of the unit not in use.

The cap 6 which covers the animal prodder end 8 of the unit 1, when it is not in use, is provided with an eye or hook member 9 at its distal end so as to enable electric fence wire (not shown) to be attached thereto.

The end 10 of the unit 1 primarily designed to be attached to electric fence wire so as to actuate the mechanism of the unit, is provided with an inner insulated casing, 11 within which there is provided a slidable shaft 12, to the butt end of which shaft there is secured a piston or trigger 13 which preferably has a ramped surface 14 (FIG. 2), such that on movement of the shaft within the casing the trigger 13 moves within the casing so as to cause a plunger 15, associated with an electrical switching mechanism 16 to ride up the ramped surface 14 and actuate a switch by closing same. The plunger 13 may depend inwardly from one side of the casing. In this form of the invention the shaft and associated integers are constructed of a suitable metal material.

The switch mechanism 16 is associated with the plunger 15 and is also in an electrical circuit, with a battery 20, a battery charger 21 and a pulse generating unit 22 all of which are provided within the outer casing.

The distal end of the shaft protrudes from within the insulated casing 11 and may be provided with an eye or hook 23, so as to enable fencing wire or the like to be attached thereto.

Urging the shaft inwardly of the casing there is provided a spring member 24, preferably covered with a rubber or like insulating composition, the arrangement being that pressure being applied to the shaft from outside the unit, (e.g. by the pressure being applied to an electric fence wire attached to the eye 23 at the end of the shaft 12) will cause the shaft to move outwardly from within the casing against the urging of the spring 24.

The movement of the shaft 12 against the urging of the spring 24 will cause the trigger 13 to move outwardly from within the casing and to thus cause the plunger 15 to ride up the ramped surface 14 of the trigger 13 and actuate the switch mechanism with which it is associated. Upon actuation of the switch, the circuit will be initiated and the charge carried to the shaft by wiring of a known kind (not shown).

On the circuit becoming completed the electrical charge will be carried through the shaft 12 to an electric fence wire (not shown) attached thereto and the fence will become electrified. The charge will be earthed by the animal which will be in contact with the electric fence wire (not shown) and the animal will receive a shock.

The shaft 12 within the casing 11 is only caused to move outwardly thereof, against the bias of the spring 24 at such time as pressure is applied thereto from the wire attached to the hook 23 at the distal end of the shaft 12. Such pressure would arise from an animal (not shown) brushing against the wire of the fence.

This particular end 10 of the combined unit is also provided with an end plate 29, the end plate being adapted to be placed over and therefore accommodate substantially medially thereof the shaft 12 such that the plate 29 fits over the shaft 12 at end 10 of the unit. The end plate 29 may, in one form of the invention, be formed with a weather seal to assist in keeping the inner casing free from rain and the like. The weather seal may be formed integrally within the end plate.

This end plate 29 is integrally formed with a screw threaded sleeve 27 which is adapted to engage with a screw thread 30 provided on the body of the casing, the tensioning of the screw threaded sleeve 27 compressing the spring 24 between the underside of the end plate 29 and the trigger or piston 13, the pressure compressing the spring and making it more difficult to move the shaft outwardly against the urging of the spring, as the tension becomes greater. This then avoids the actuation of the switch mechanism by such things as wind and inclement weather or alternatively by the accidental brushing of a fence by an animal or the like.

Between the switch plunger and the trigger or piston there may be provided a layer of insulation 32 so that once the shaft 12 and other integers become electrified the layer of insulated protects the switch from becoming electrified and thereby burning out.

In a further form of this invention the end 10 of the unit, adapted to be used as the electric fence actuating means, may be provided with an inner casing 11, the casing 11 having at its innermost end 34, a switch plunger 35 which depends inwardly of the casing 11.

The shaft 12 within the casing 11 has attached to its butt end a trigger or piston, in the form of a substantially rectangular metal plate 36, which, when the shaft is in its position of rest, depresses the switch plunger 35 so as the switch is in the off position. The trigger or piston 36, which may be constructed of a suitable metal material, is separated from the switch plunger by a layer of insulation 39, so as to protect the switching mechanism from being burnt out once the shaft and associated integers become electrified.

The shaft within the casing is urged inwardly of the casing by means of a spring 24 and therefore pressure is required to be applied to the distal end of the shaft in order to move the shaft outwardly of the casing 11, against the bias of the spring 24. In this form of the invention, the spring is coated with a suitable rubber insulating material.

In a further form of the invention (FIG. 3) the distal end of the unit is provided with weather seal 41 below which there is a tension plate 42, the tension plate being capable of being moved inwardly of the casing by means of compensating bolts 43 associated therewith. The distal end 44 of the spring 24 abuts against the inner face of the tension plate 42 and therefore as the tension plate is brought within the unit, by means of the tightening of the compensating bolts 43, the spring 24 is compressed between the tension member and the upper face of the trigger 36 so that an increased amount of pressure is required to move the shaft outwardly from within the casing.

Upon the shaft being moved outwardly of the casing the plunger or trigger is moved away from the inwardly depending switch plunger and therefore the switch is able to move to the "on" position thereby causing the shaft and associated integers to become live, the animal or the like, pressing against the fence wire, which pressure actuates the mechanism, earthing the circuit of the switching mechanism, battery charger, battery, and pulse generating unit thereby receiving an electrical shock.

Upon the shaft 12 returning to its position of rest and depressing the switch plunger the switch will return to an "off" position and the shaft and wire will return to their dormant position.

At the other end 8 of the unit 1 there are provided two outwardly depending pin members 48 and 49 which are utilized when the unit is being used as an animal prodder. However, the invention is in no way limited to use with only two pins as one, two or any number of pins may be used with the invention.

In this form of the invention there are two outwardly depending pins 48 and 49, both pins being slidably operable within casings 50 provided within the end 8 of the unit 1, each of the pins being spring biased outwardly from within the casings 50 by a spring member 58 which is covered with a suitable insulating material. The arrangement is such that upon pressure being applied to the pins they will slide inwardly of the casings 50 and actuate switch mechanisms by the method hereinbefore described.

In this form of the invention one such casing 50 is provided, at its butt end, with a switch mechanism 52 which is associated with the battery 20, battery charger 21 and pulse generating unit 22 of the combined unit, these being in circuit with the switch mechanism 52.

At the butt end of the pin 48 there is provided a piston or trigger which, when the pins are in their position of rest, is positioned substantially medially of the inner casing, the switch which is at the butt end of the casing, being in an "off" position when it depends outwardly from within the casing wall.

Upon the pins 48 and 49 being brought into contact with an animal (not shown), the pressure applied to the pins, forces them against the urging of the spring 58, inwardly of the inner casings 50 such that the pin 48 associated with the switch 52 is brought into contact with it the plunger of the switch mechanism such that it depresses the plunger which activates the switching mechanism, the circuit of the switching mechanism, the battery, the battery charger and the pulse generating unit being completed when the pin is brought into contact with the animal, as the animal will earth the electrical charge carried by the pin, the charge being carried to the pin by wiring of a known type, thereby electrifying the pin.

In one preferred form of the invention the outwardly depending pins 48 and 49 are provided with recesses (not shown) in their distal ends, such that wires may be inserted into the recesses and securely affixed thereto, the wires thereafter being attached to the collar of a dog or similar animal, which may be trained by electrical impulses.

In such a case the operator of the unit may control the electrical charges by means of a manual switch, which may be provided on the outside of the casing.

In use, the end 10 of the unit 1 adapted to be used as an electric fence actuating means is uncovered and fencing wire (not shown) is attached to the hook or eye 23 at the distal end of the shaft 12. The end of the unit which may be used as a cattle prodder is then covered by the cap 6 which has depending outwardly therefrom a securing means 9 such as an eye or hook and the wire on the fence is also attached to the hook or eye 9. Therefore, the unit completes the strand or run of wire (not shown).

Upon an animal rubbing against the fence wire, the shaft will be caused to move outwardly from within the casing thereby actuating the switch in the manner hereinbefore described and causing an electrical charge to be carried through the fencing wire.

Upon the pressure being released from the wire, (e.g. by the animal moving away from the wire after having received a shock) the shaft returns to its position of rest and the fence wire becomes dormant once more. The pressure which needs to be applied to the fence to actuate the mechanism may be adjusted by means of the end plate 29 or tension member 42 and therefore if the animal is, for example, a cattle beast, the unit may be tensioned so as a greater amount of pressure is required to be asserted to the wire and unit before the unit is actuated. In the case of a smaller animal the tension may be slackened off somewhat so as less pressure will be required to actuate the mechanism.

When the cattle prodder end 8 of the unit 1 is in use the electric fence attachment is covered by a cap 51 and when the pins of the unit are brought into contact with an animal or the like (not shown) the pins are caused to move inwardly within the casings, the actuating pin 48 coming into contact with the switching mechanism thereby causing an electrical charge to come through the actuating pin, the circuit being completed when the animal earths the charge and thereby receives a shock. This unit can of course be used and actuated by a manual switch, (not shown), if desired, which manual switch could be connected to the inner switch mechanisms and operated by a switch on the exterior of the unit.

Furthermore, if so desired, wires may be inserted in the end of the outwardly depending pins 48 and 49 and thereafter attached to the collar of an animal, such as a dog, (not shown) so as to enable the animal to be trained by the control of electrical impulses.

Thus, by this invention there is provided a combined unit which may be used either as an animal control means or alternatively as an electric fence actuating unit.

I claim:

1. An animal control device comprising: a container having first and second ends and a hollow mid-section; pin means slidably mounted in said container and projecting out of said first end thereof; first spring means for urging said pin means outwardly of said container; a source of electrical potential in said container; first switch means in said container and connected in a first circuit with said pin means and said source of electrical potential and completing said first circuit when said pin means is brought into contact with an animal to energize said pin means in response to inward movement thereof; a first connector at said second end of said container adapted for attachment to a fence wire and including a shaft extending inwardly of said container and mounted therein for motion axially of said shaft; a second spring within said container urging said shaft inwardly of said container; a second switch mounted in said container engaged by said shaft and connected in a second circuit with said shaft and said source of electrical potential and completing said second circuit when said shaft is pulled away from said container to energize said shaft in response to outward movement thereof; a first insulating cap attached to said second end of said container and enclosing said first connector; and a second cap provided with a second fence connector adapted to be attached to said first end of said container to cover said pin means, whereby said device may alternatively be used to electrify a fence when said first cap is removed from said container and said second cap is attached thereto with said first and second connectors secured to fence wires.

2. The device of claim 1 wherein said shaft is provided at its base end with a ramped surface and said second switch includes a movable plunger engaging said ramp surface, such that upon movement of said shaft and its associated ramped surface, said plunger is caused to ride up said ramped surface to actuate said second switch.

3. The device of claim 1 further comprising a substantially rectangular plate attached to the base of said shaft, and wherein said second switch is provided with a plunger aligned with the axis of said shaft and adapted to be engaged by said plate when said shaft is fully inserted in said container, whereby when said shaft is moved outwardly of said container, said plunger is released and said second switch is actuated.

4. The device of claim 1 wherein said container defines an integral screw thread about said shaft, said device further comprising a compensation member threadedly received within said screw thread and adapted to form a reaction base for said second spring means to urge said shaft inwardly, whereby said compensating member may be selectively screwed inwardly and outwardly of said container to control the force of said spring urging said plunger.

* * * * *